United States Patent [19]
Stevens

[11] 3,829,149
[45] Aug. 13, 1974

[54] BEAM CONSTRUCTION
[75] Inventor: F. Bradley Stevens, Ann Arbor, Mich.
[73] Assignee: L & L Products, Inc., Romeo, Mich.
[22] Filed: Feb. 9, 1973
[21] Appl. No.: 331,079

[52] U.S. Cl................. 296/28 R, 293/63, 267/140
[51] Int. Cl........................................... B62d 27/04
[58] Field of Search .... 293/63 V, 62 V; 267/140 V, 267/139 V, 152 V, 153 V; 296/28 R

[56] References Cited
UNITED STATES PATENTS
3,694,018   9/1972   Levering............................ 267/140
3,718,364   2/1973   Fischer et al. ........................ 293/63

Primary Examiner—James B. Marbert
Attorney, Agent, or Firm—Harness, Dickey & Pierce

[57] ABSTRACT

A novel structural beam having energy absorbing and load characteristics admirably suited for protecting the passenger compartment of a vehicle during collision, for example, as a side guard beam. The beam construction comprises a blade-supporting matrix of novel composition and structure contained within a hollow sheet metal box beam.

20 Claims, 6 Drawing Figures

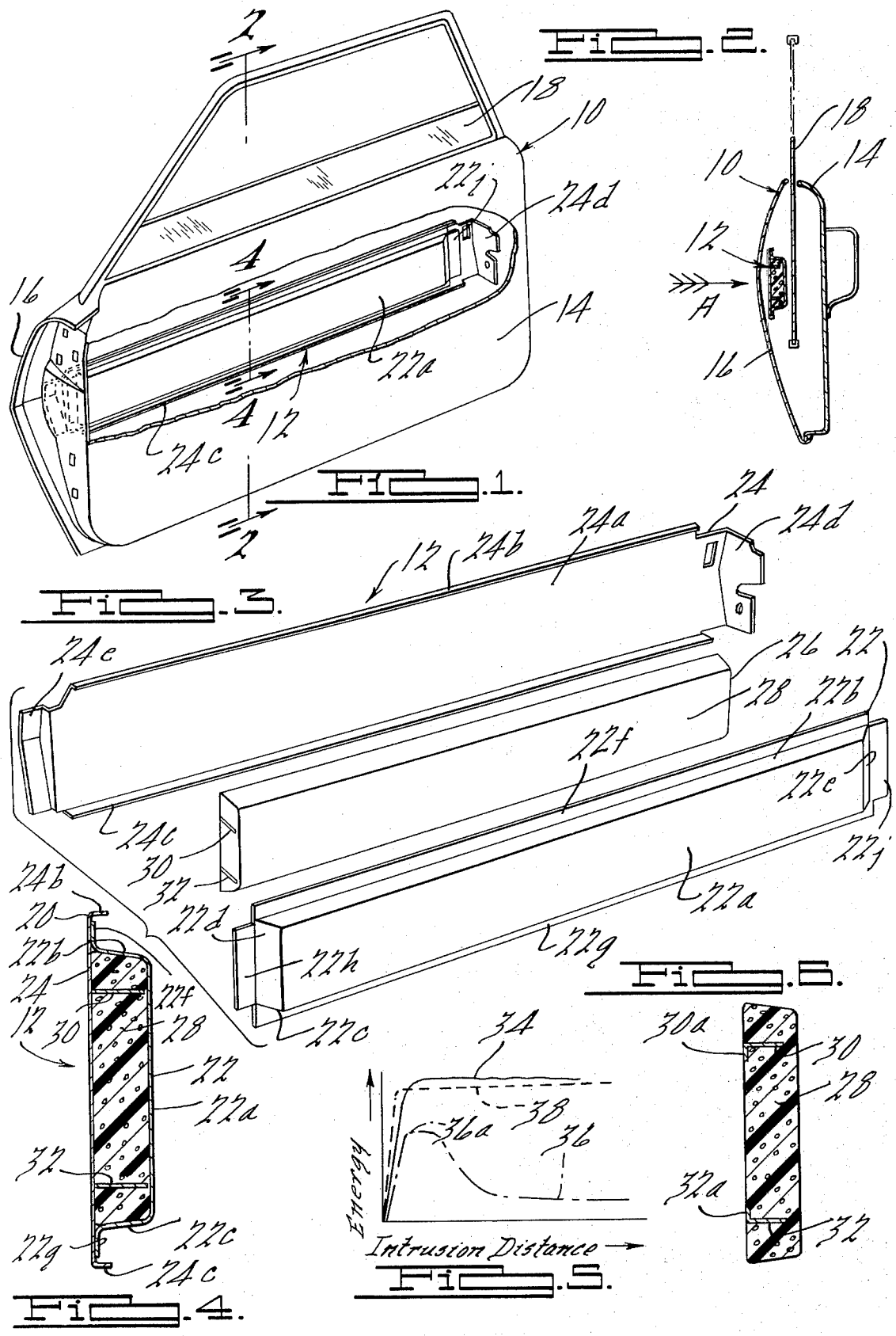

BEAM CONSTRUCTION

BACKGROUND AND SUMMARY OF THE INVENTION

The present invention relates to a beam construction which is admirably suited for use as a vehicle guard beam to protect vehicle occupants in a collision.

In order to provide greater protection for vehicle occupants in the event of a collision, side guard beams are now incorporated in many new vehicles. Such beams must comply with rather stringent requirements in order to provide adequate crash protection. Various types of side guard beams have heretofore been proposed. Among the problems with such prior beams are that: they are relatively expensive; they often are difficult to assemble, requiring substantial riveting and/or welding; they may be fabricated from high-strength steel, which is both expensive and difficult to fabricate; they use relatively heavy gauge metal and are generally heavy; they may be susceptible to local buckling and consequent early failure; and they may not exhibit optimum loading and energy-absorbing characteristics.

Among the objects of the present invention are to overcome the above-mentioned problems by providing a novel beam construction which: attains optimum loading and energy absorbing characteristics with a relatively inexpensive, relatively lightweight structure; permits a reduction in material and hence, important weight and cost savings; is less difficult to assemble; which, for a given level of loading, has vastly improved resistance to local buckling; is well-suited for automotive application, being impervious to moisture and vermin; utilizes less expensive grades of steel which are cheaper and easier to weld and; is all around a better beam than has heretofore been available.

The foregoing objects, as well as additional objects, features, advantages, and benefits of the invention, will be seen in the ensuing description and claims which are to be taken in conjunction with the accompanying drawing.

BRIEF DESCRIPTION OF THE DRAWING

The drawing illustrates a preferred embodiment of the invention in accordance with the best mode presently contemplated for carrying out the invention.

FIG. 1 illustrates a perspective view of a vehicle door with a portion broken away to show a beam according to the present invention mounted therein.

FIG. 2 is a vertical sectional view taken along line 2—2 in FIG. 1.

FIG. 3 is an enlarged exploded perspective view of the beam of FIG. 1.

FIG. 4 is an enlarged vertical sectional view taken along line 4—4 in FIG. 1.

FIG. 5 is a graph plot useful in illustrating how the present invention improves the energy absorbing characteristic of a beam.

FIG. 6 is a view similar to FIG. 4 illustrating a modified arrangement.

DESCRIPTION OF THE PREFERRED EMBODIMENT

In FIGS. 1 and 2, a car door 10 is shown with a side guard beam 12 constructed in accordance with the present invention. Door 10 comprises an inner panel 14 and an outer panel 16 secured together in conventional fashion. A window 18 is arranged within door 10 for up and down movement. Beam 12 is disposed at a desired vertical level in a generally horizontal orientation between the path of travel of window 18 and outer door panel 16. The ends of beam 12 are securely affixed to door 10 so that the beam remains supported during impact.

Further details of beam 12 are shown in FIGS. 3 and 4. Beam 12 comprises a hollow box beam 20 of rectangular configuration formed by a pair of sheet metal beam elements 22 and 24. Beam 20 contains a novel matrix insert 26 through which the benefits and advantages of the present invention arise. Beam element 22 is dished inwardly to form a bottom wall 22a, side walls 22b and 22c, and end walls 22d and 22e. Coplanar flanges 22f, 22g, 22h and 22j are turned outwardly around the outer edges of walls 22b, 22c, 22d and 22e respectively, for attachment to beam element 24. Beam element 24 comprises a flat wall 24a to which flanges 22f, 22g, 22h and 22j are attached (preferably by welding) and which encloses the interior of element 22, insert 26 being contained therein. A pair of stiffening flanges 24b and 24c extend along the upper and lower edges of wall 24a, and the ends of beam element 24 are suitably shaped as at 24d and 24e for attachment to door 10. When beam 12 is mounted on door 10, walls 24a and 22a form compression and tension members respectively of the beam while side walls 22b and 22c form webs connecting the compression and tension members.

Insert 26 comprises a solid supportive matrix 28 of foamlike structure which supports one or more sheet metal blades as additional webs within the beam. In the illustrated arrangement, two blades 30 and 32 are supported by matrix 28. Blades 30 and 32 are of rectangular shape and are supported in generally horizontal, planar orientations perpendicular to walls 22a and 24a and parallel to walls 22b and 22c. The width of each blade 30 and 32 is the same as or just slightly less than the width of insert 26. While insert 26 is unattached to beam 20, its cross section is preferably dimensioned for a snug fit therein to maintain blades 30 and 32 in their described location.

Insert 26 is a selected fraction of the length of the hollow interior of box beam 20. It is contemplated that the length of insert 26 may be as little as approximately 20 percent of the interior length of the beam. While the particular length of insert 26 may be increased above this 20 percent figure, the use of the smaller length insert achieves acceptable energy-absorbing and load performance with minimum material. With the insert positioned at the point of loading on the beam, the beam modulus in this vicinity is greatly increased and the beam thus provides improved energy-absorbing and load characteristics.

Also, in the illustrated embodiment, blades 30 and 32 are coextensive in length with insert 26. In order to reduce the possibility of local buckling, it may be desirable to construct beam 12 so that the beam modulus undergoes a gradual transition at ends of the insert. One way of doing this is by making the length of blades 30 and 32 less than the length of matrix 28 so that there is a transition region of foam matrix material between the ends of the blades, and the empty hollow beam cross section adjacent the ends of the insert. A second way to effect a gradual change in modulus is to offset one of the blades longitudinally relative to the other blade. A third way is to round off the ends of the blades. A fourth way is to insert an additional short blade into the center of the matrix. A fifth is to alter the compressive strength of the matrix, for example, by briquetting more material into the center of the matrix.

Matrix 28 is a solid foam-like composition of aggregate distributed within and bonded by a binder. The following examples illustrate two possible ways for preparing matrix 28.

EXAMPLE A

An aggregate of expanded perlite is mixed with a binder of liquid thermosetting phenolic resin. The expanded perlite has a density of preferably 7 to 10 pounds per cubic foot (pcf) and is composed of particles preferably on the order of 250 micron size. The expanded perlite is a solid substance, yet, in this form, is flowable, like water. Approximately equal weights of aggregate and liquid are mixed together and tamped or briquetted at approximately 200 to 500 pounds per square inch (psi). The mixture is baked at a temperature of approximately 275°F–350°F until cured to form a solid brick having a density of approximately 20 to 35 pcf, a compressive strength of approximately 500 psi or more, and a tensile strength of approximately 200 to 300 psi. As will be appreciated, the foregoing quantities of the present method may be varied to some degree to arrive at the most efficient and economical formulation for given design specifications.

EXAMPLE B

An aggregate of expanded perlite (the same as in Example A) is mixed with a binder of liquid polyester resin. The binder may include styrene and the polyester resin may be also water extended. Approximately 35 percent aggregate and 65 percent (by weight) liquid are mixed, and the mixture is tamped and then baked at approximately 185°F until cured. The resulting product has the same characteristics as the product of Example A. Here too, the quantities may be varied to some degree to arrive at the optimum formulation for given design specifications.

It is contemplated that various methods may be used to support blades 30 and 32 within matrix 28. For example, the blades could be inserted into the mixture before it is cured; the matrix could be cut or formed to provide slots for reception of the blades; or the matrix could be formed in several bricks with the blades being sandwiched between bricks.

It is also contemplated that various blade configurations and blade materials may be utilized. For example, high-yield strength steel may be used for blades 30 and 32. Since such material has a lower percentage stretch available than has lower-yield strength material, it is desirable to narrow the blades to obtain optimum performance and this has the advantage of reducing beam weight. Another possible blade configuration is shown in FIG. 6 where the outer lengthwise edges of blades 30 and 32 are provided with flanges 30a and 32a, respectively, and the widths of the blades are reduced. As beam 12 bends, the narrower blades of FIG. 6 are supported by matrix material against tension wall 22a. With this construction, the blades are loaded through the matrix via flanges 30a and 32a to develop loading on the blades at a lesser beam deflection than if flanges 30a and 32a were omitted. By including flanges 30a and 32a to develop this loading of the blades at this lesser beam deflection, it is believed that blades 30 and 32 stretch more for a given amount of beam deflection, and incidentally resist buckling along their compressive edges, than if the blades were of the same narrow width but without the flanges. Thus, it is believed that flanges 30a and 32a improve the energy absorbing characteristic of the beam by enabling the blades to absorb more energy during initial beam deflection. Thus, it will be perceived that the invention contemplates a variety of embodiments depending upon the desired beam performance.

Some of the many advantages of the present invention can be seen when door 10 is subjected to impact in the direction of arrow A in FIG. 2 at a location somewhere in the middle of the length of the beam. Initially, outer door panel 16 readily collapses onto beam 12. As beam 12 begins to absorb the impact, the beam loading rises rapidly and the beam begins to bend. However, as the beam bends, it is able to support the load and does so in the fashion graphically illustrated in FIG. 5. FIG. 5 illustrates three graph plots of energy absorbed as a function of intrusion distance (i.e., beam deflection). The solid line graph plot 34 shows energy absorbed by beam 12 as a function of intrusion distance. The dot-dash line graph plot 36 illustrated energy absorbed by other types of prior beams as a function of intrusion distance, while the broken line graph plot 38 illustrates an ideal plot of energy absorbed as a function of intrusion distance. It will be observed that graph lot 36, which is illustrative of prior type beams, has an initial plateau 36a which is followed by a decline in energy absorption capability. In contrast, graph plot 34 for beam 12 closely approximates the ideal graph plot 38 where the beam maintains a high, relatively constant energy absorbing capability as the beam is increasingly deflected. The energy absorbing and load characteristics of beam 12 effectively limit penetration into the passenger compartment to afford optimum side impact protection to occupants.

The remarkable performance achieved by a beam constructed in accordance with the present invention arises from the cooperative functioning of the individual beam elements constituting the beam structure described above. Most of the energy absorbed by beam 12 is expended in stretching wall 22a, in bending walls 22b and 22c, and in bending blades 30 and 32. The support provided for blades 30 and 32 by matrix 28 is such that the blades are maintained in their horizontal planes as they are bent and this greatly increases the modulus and the energy absorbing capability of the beam. The fact that the blades are not attached to, but rather, are free to slip in shear with respect to the relatively low tensile, low adhesion matrix and to walls 22a and 24a permits the blades to distribute strain over a large portion of their length, and this tends to prevent localized blade failure and consequent buckling at that point of the beam also.

The mechanical characteristics of matrix 28 are also highly advantageous. Like foamed concrete of comparable density, it reaches full compressive loading within 1 percent deflection, but unlike concrete, which is subject to brittle failure and crumbling, it maintains stable load bearing characteristics through the subsequent 40 percent of deflection. Since matrix 28 has a relatively substantial compressive strength, it tends to resist crushing during impact, thereby maintaining separation between walls 24a and 22a during bending. It is assisted in this task by blades 30 and 32, which it in turn supports in the proper position. Since insert 26 is enclosed in beam 20, matrix 28 cannot extrude through the sheet metal enclosure and evade supporting compressively wall 22a and blades 30 and 32. Thus, enclosed construction is essential to the cooperative functioning of the matrix, blades, and walls. Also, since matrix 28 does not possess extremely high tensile strength, it exhibits a beneficial fracture phenomenon as beam 12 bends. This fracture phenomenon is characterized by a plurality of transverse vertical fractures through the matrix material which are distributed along the length of the insert. The number of fractures occurring in the matrix depends upon the amount of bending to which the beam is subjected, the fractures being more closely spaced for greater beam bending. In the bent beam, the fractured matrix appears as a multitude of individual "pillars", which are separated by the fractures. These "pillars" exhibit the desirable compressive loading characteristics mentioned above (i.e., maintaining separation of walls 22a and 24a). Moreover, they are not inherently reduced in thickness (i.e., the dimensions in the direction of arrow A) during the fracture phenomenon. This is in marked contrast to the performance of moderate tensile polyurethane foams and chipboard whose thickness is inherently reduced when so flexed.

Furthermore, matrix 28 is not subject to the single localized fracture that characterizes high tensile fir or oak and which results in subsequent buckling of wall 24a and/or tearing of wall 22a. Thus, the mechanical behavior of matrix 28 facilitates energy absorption by the metal beam elements as part of a cofunctioning ensemble. Moreover, it will be observed that with insert 26 fitting snugly within beam 20, fasteners, riveting and welding of the insert are not required, the only welding required being that to fasten beam elements 20 and 22 together. A further benefit of the invention is that less expensive metal is required for box beam 20. For a given energy absorbing capability, box beam 20 can be made of lighter gauge and lower strength steel stock than has typically been used heretofore in beams of this type. The lower strength (i.e., low carbon) steel stock can be fabricated (i.e., formed and welded) with greater ease than higher strength (i.e., high carbon) steel. However, the invention still permits the use of high strength steel for blades 30 and 32, if desired. When such is the case, it will be noted that the blades need only be sheared from stock and do not have to be fabricated.

A further advantage of the invention is that matrix 28 can be made at a very low cost for a foam insert material. While the matrix exhibits advantageous mechanical characteristics, the particular formulations described in Examples A and B achieve a significant cost reduction for a foamed matrix structure.

From the foregoing, it can be seen that the present invention provides a beam which not only possesses desirable and advantageous mechanical characteristics, but also achieves a significant cost savings. While the invention has been illustrated as applied to a side guard beam for a vehicle, it will be appreciated that the invention may also be practiced in other surroundings where similar strength and economy are desired, for example, in bumpers, etc.

It is to be understood that the foregoing description is that of a preferred embodiment of the invention. Various changes and modifications may be made without departing from the spirit and scope of the invention as defined by the appended claims.

What is claimed is:

1. In a beam construction, the combination comprising a hollow sheet metal box beam, said hollow sheet metal box beam comprising a tension wall member and a compression wall member, said two wall members being disposed in spaced parallel planes which are perpendicular to a component of load applied to the beam, said hollow sheet metal box beam further including means connecting the peripheries of said two wall members to enclose the hollow interior of the beam, a blade-supporting matrix of foam-like but fracturable and crush-resistant structure comprising aggregate and binder with the aggregate being distributed within and bonded by the binder, said matrix being unattached to and fitting snugly within the cross section of said hollow sheet metal box beam between said two wall members thereof and at least one sheet metal blade supported by said matrix, said at least one blade being disposed in a plane which is parallel to said component of load applied to the beam, said at least one blade extending lengthwise of the beam and having a width substantially equal to the distance between said two wall members, said matrix possessing sufficiently large compressive strength for maintaining the spacing of said two wall members as the beam is increasingly bent by the load, but said matrix possessing sufficiently small tensile strength that it also fractures as the beam is increasingly bent by the load.

2. The combination of claim 1 wherein the length of said matrix is a selected fraction of the length of the hollow interior of the box beam.

3. The combination of claim 1 wherein the length of said at least one blade is approximately equal to the length of said matrix.

4. The combination of claim 3 wherein the lengths of said at least one blade and said matrix are selected fractions of the length of the hollow interior of the box beam.

5. The combination of claim 1 wherein said aggregate comprises expanded perlite and said binder is selected from the group consisting of phenolic resin and polyester resin.

6. In a beam construction, the combination comprising a hollow box beam having spaced wall members disposed to be generally perpendicular to a component of load applied to the beam and an insert contained therein between said wall members, said insert comprising a fracturable, crush-resistant matrix, said matrix comprising an aggregate distributed within and bonded by a binder, said matrix possessing sufficiently large compressive strength for maintaining the spacing of said wall members as the beam is increasingly bent by the load, but said matrix possessing sufficiently small tensile strength that it also fractures as the beam is increasingly bent by the load and at least one blade supported between said wall members by said matrix.

7. The combination of claim 6 wherein said aggregate comprises expanded perlite.

8. The combination of claim 7 wherein said binder comprises phenolic resin.

9. The combination of claim 8 wherein the expanded perlite has a particle size on the order of 250 microns.

10. The combination of claim 7 wherein said binder comprises a polyester resin.

11. The combination of claim 10 wherein the expanded perlite has a particle size on the order of 250 microns.

12. The combination of claim 6 wherein said aggregate comprises expanded perlite having a particle size on the order of 250 microns and said binder comprises thermosetting phenolic resin, said matrix being made by mixing approximately equal weights of said expanded perlite and said phenolic resin, compressing the mixture, and curing the mixture to form the matrix.

13. The combination of claim 6 wherein said aggregate comprises expanded perlite having a particle size on the order of 250 microns and said aggregate comprises polyester resin, said matrix being made by mixing approximately 35 percent aggregate and 65 percent binder by weight, compressing the mixture, and curing the mixture to form said matrix.

14. The combination of claim 6 wherein said insert is unattached within said box beam and fits snugly therein.

15. The combination of claim 6 wherein said box beam is of rectangular shape and comprises a compression wall member, a tension wall member and side wall members perpendicular to the tension and compression wall members, said at least one blade being disposed parallel to said side wall members.

16. The combination of claim 15 wherein the width of said at least one blade is approximately equal to the width of said side wall members.

17. The combination of claim 15 wherein the length of said at least one blade is equal to a selected fraction of the lengths of said wall members.

18. In a beam construction, the combination comprising a hollow enclosed box beam comprising a pair of spaced wall members disposed in generally parallel planes which are perpendicular to a component of load applied to the beam and a foam-like matrix insert disposed within said box beam and enclosed thereby, said insert fitting snugly between said two wall members, said insert comprising aggregate and binder with the aggregate distributed within and bonded by the binder, said insert possessing sufficiently large compressive strength for maintaining the spacing of said wall members as the beam is increasingly bent by the load, but said matrix possessing sufficiently small tensile strength that it also fractures as the beam is increasingly bent by the load.

19. The combination of claim 18 wherein said aggregate comprises expanded perlite having a particle size on the order of 250 microns and said binder comprises thermosetting phenolic resin, said matrix being made by mixing approximately equal weights of said expanded perlite and said phenolic resin, compressing the mixture, and curing the mixture to form the matrix.

20. The combination of claim 18 wherein said aggregate comprises expanded perlite having a particle size on the order of 250 microns and said aggregate comprises polyester resin, said matrix being made by mixing approximately 35 percent aggregate and 65 percent binder by weight, compressing the mixture, and curing the mixture to form said matrix.

* * * * *